United States Patent [19]
Greenberg

[11] Patent Number: 5,828,513
[45] Date of Patent: Oct. 27, 1998

[54] SERVO ADDRESS APPARATUS AND POSITIONING METHODS FOR READ, WRITE AND SEEK OPERATIONS IN A DIRECT ACCESS STORAGE DEVICE

[75] Inventor: Richard Greenberg, Rochester, Minn.

[73] Assignee: International Business Machines Corporation, Armonk, N.Y.

[21] Appl. No.: 568,829

[22] Filed: Dec. 7, 1995

[51] Int. Cl.$^6$ .................................................. G11B 5/596
[52] U.S. Cl. ........................... 360/77.08; 360/48; 360/53; 360/49
[58] Field of Search ................................. 360/48, 51, 49, 360/77.1, 78.08, 53; 369/43, 44, 27, 58

[56] References Cited

U.S. PATENT DOCUMENTS

| | | | |
|---|---|---|---|
| 3,729,725 | 4/1973 | Denney et al. | 340/174.1 G |
| 3,742,449 | 6/1973 | Blair | 340/146.1 |
| 4,912,695 | 3/1990 | Senshu | 369/59 |
| 5,043,830 | 8/1991 | Nobuhiro | 360/39 |
| 5,069,547 | 12/1991 | Huggins et al. | 356/374 |
| 5,136,440 | 8/1992 | Sidman | 360/78.04 |
| 5,136,592 | 8/1992 | Weng | 371/39.1 |
| 5,170,299 | 12/1992 | Moon | 360/77.08 |
| 5,241,546 | 8/1993 | Peterson et al. | 371/37.1 |
| 5,255,136 | 10/1993 | Machado et al. | 360/77.02 |
| 5,262,907 | 11/1993 | Duffy et al. | 360/77.05 |
| 5,268,800 | 12/1993 | Nielsen | 360/77.01 |
| 5,339,207 | 8/1994 | Moon et al. | 360/77.05 |
| 5,381,281 | 1/1995 | Shrinkle et al. | 360/77.08 |
| 5,420,893 | 5/1995 | Ward | 360/51 X |
| 5,434,719 | 7/1995 | Miller et al. | 360/53 |
| 5,500,848 | 3/1996 | Best et al. | 360/48 X |
| 5,517,631 | 5/1996 | Machado et al. | 360/77.08 |
| 5,523,903 | 6/1996 | Hetzler et al. | 360/77.08 |
| 5,526,211 | 6/1996 | Hetzler | 360/48 X |
| 5,559,765 | 9/1996 | Andou | 360/48 X |
| 5,587,850 | 12/1996 | Ton-that | 360/77.08 |
| 5,596,460 | 1/1997 | Greenberg et al. | 360/49 X |

FOREIGN PATENT DOCUMENTS

| | | |
|---|---|---|
| 0578598A2 | 1/1994 | European Pat. Off. . |
| WO91/02354 | 2/1991 | WIPO . |

OTHER PUBLICATIONS

Method and Error Correcting Code (ECC) Apparatus for Storing Predefined Information With ECC in a Direct Access Storage Device by Earl A. Cunningham et al., S.N. 08/469,657 filed Jun. 6, 1995.

Primary Examiner—Aristotelis M. Psitos
Assistant Examiner—K. Wong
Attorney, Agent, or Firm—Joan Pennington

[57] ABSTRACT

Apparatus and methods are provided to prevent writing and reading at an incorrect position and seeking to incorrect position. A servo address is written in a servo burst and loaded into an error correcting code (ECC) generator for generating write positioning ECC check bytes. The write positioning ECC check bytes are written at the end of the written servo address in the servo burst. When customer data is to be written, the written servo address and write positioning ECC check bytes are read and loaded into the ECC generator to determine whether the writing position is correct. Then the servo address or logical block address (LBA) is preloaded into a second error correcting code (ECC) generator and the customer data is written and loaded into the second error correcting code (ECC) generator for generating data and read positioning ECC check bytes. The data and read positioning ECC check bytes are written at the end of the written customer data. When customer data is to be read, the LEA is preloaded into the second error correcting code (ECC) generator and then the written customer data and the data and read positioning ECC check bytes are read and loaded into the second ECC generator to determine whether the reading position is correct. A secondary servo address that includes a portion of the servo address is written in the servo burst. The secondary servo address can be written adjacent to the servo address; in an automatic gain control (AGC) field; or in a fine servo field of the servo burst. The secondary servo address is read to determine a transducer head position. During a write operation, the secondary servo address can be used exclusively or as a redundancy to the main servo address. The secondary servo address can be used instead of the write positioning check bytes.

17 Claims, 8 Drawing Sheets

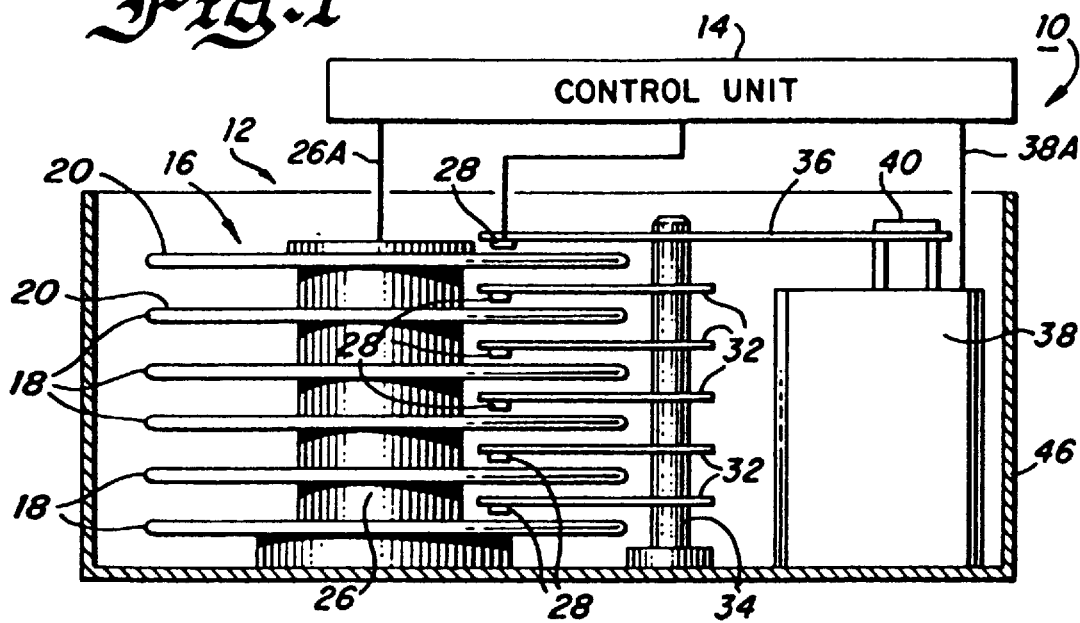
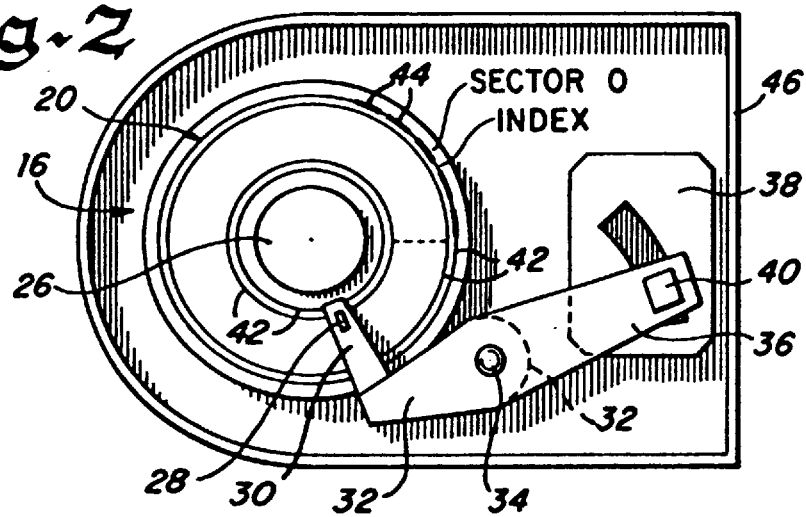

| AGC 502 | SERVO ID 504 | MAIN SERVO ADDRESS 506 | ECC 508 | FINE SERVO 510 |

| AGC 802 | SERVO ID 804 | MAIN SERVO ADDRESS 806 | ECC 808 | SEC. SERVO ADDRESS 812 | FINE SERVO 810 |

| AGC 602 | SERVO ID 604 | SEC. SERVO ADDRESS 612 | MAIN SERVO ADDRESS 606 | ECC 608 | FINE SERVO 610 |

| SEC. SERVO ADDRESS 712 | AGC 702 | SERVO ID 704 | MAIN SERVO ADDRESS 706 | ECC 708 | FINE SERVO 710 |

SERVO ADDRESS APPARATUS AND POSITIONING METHODS FOR READ, WRITE AND SEEK OPERATIONS IN A DIRECT ACCESS STORAGE DEVICE

FIELD OF THE INVENTION

The present invention relates to a direct access storage device (DASD), and more particularly to servo positioning apparatus and positioning methods for read, write and seek operations in a direct access storage device.

DESCRIPTION OF THE PRIOR ART

Disk drive units incorporating stacked, commonly rotated rigid magnetic disks are used for storage of data in magnetic form on the disk surfaces. Data is recorded in radially spaced data information tracks arrayed on the surfaces of the disks. Transducer heads driven in a path toward and away from the drive axis write data to the disks and read data from the disks.

In direct access storage devices (DASDs), it is necessary to position the transducer heads over data tracks on the disk surfaces to properly record and retrieve data. Typically this is accomplished by providing servo information on one or more disk surfaces for reading by the transducer heads. In a fixed block architecture (FBA) each data information track is divided into a predetermined number of equal-sized sectors. Each data sector typically has an identification (ID) field associated with it. The ID field contains information which identifies the data sector, and other information, such as flags to indicate defective sectors. Typically an addressing scheme is used where the data sectors are identified to the host system by a logical block number (LBN). The host computer sends a list of logical block numbers to be written or read. The disk drive controller converts the LBNs into zone, cylinder, head and sector (ZCHS) values. The servo system seeks to the desired zone, cylinder and head, and the disk drive begins reading ID fields until a match is found. Once the appropriate ID field has been read, the disk drive then reads or writes the following data field.

The assignee of the present application has provided a sector format that eliminates ID fields, referred to as the No-ID sector format. The No-ID format uses the servo position information to verify the rotational and radial position prior to reads and writes. In the No-ID sector format, the servo system is used to locate physical sectors, and a defect map is stored in solid state random access memory (RAM) to identify logical sectors. The disk data controller converts logical block numbers to physical block numbers. Both the header and data field split information are stored in RAM, not on the disk.

The data integrity and performance of a DASD has always been directly related to the robustness of the servo position information. With higher density drives and No-ID formats the integrity of the servo position information has become even more critical. A need exists to increase the robustness of determining the position of a transducing head for read, write and seek operations.

SUMMARY OF THE INVENTION

A principal object of the present invention is to provide improved positioning servo apparatus and positioning methods for read, write and seek operations in a direct access storage device. Other objects are to provide such servo positioning apparatus and positioning methods substantially without negative effects, and that overcome many of the disadvantages of prior art arrangements.

In brief, servo positioning apparatus and positioning methods are provided to prevent writing and reading at an incorrect position and to determine a transducer head position in a direct access storage device. A servo address is written in a servo burst and loaded into an error correcting code (ECC) generator for generating write positioning ECC check bytes. The write positioning ECC check bytes are written at the end of the written servo address in the servo burst. When customer data is to be written, the written servo address and write positioning ECC check bytes are read and loaded into the ECC generator to determine whether the writing position is correct.

Then the servo address or logical block address (LBA) is preloaded into a second error correcting code (ECC) generator and the customer data is written and loaded into the error correcting code (ECC) generator for generating data and read positioning ECC check bytes. The data and read positioning ECC check bytes are written at the end of the written customer data. When customer data is to be read, the LBA is preloaded into the second error correcting code (ECC) generator and then the written customer data and the data and read positioning ECC check bytes are read and loaded into the second ECC generator to determine whether the reading position is correct.

A secondary servo address that includes a portion of the main servo address is written in the servo burst. The secondary servo address can be written adjacent to the main servo address; in an automatic gain control (AGC) field; or in a fine servo field of the servo burst. The secondary servo address is read to determine a transducer head position. During a write operation, the secondary servo address can be used exclusively or as a redundancy to the main servo address. The secondary servo address can be used instead of the write positioning check bytes.

BRIEF DESCRIPTION OF THE DRAWINGS

The present invention together with the above and other objects and advantages may best be understood from the following detailed description of the preferred embodiments of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIG. 5 illustrates a servo positioning embodiment in accordance with the present invention;

FIG. 6 illustrates an alternative servo positioning embodiment in accordance with the present invention;

FIG. 7 illustrates another alternative servo positioning embodiment in accordance with the present invention;

FIG. 8 illustrates another alternative servo positioning embodiment in accordance with the present invention.

DETAILED DESCRIPTION OF THE PREFERRED EMBODIMENTS

Figure 3:
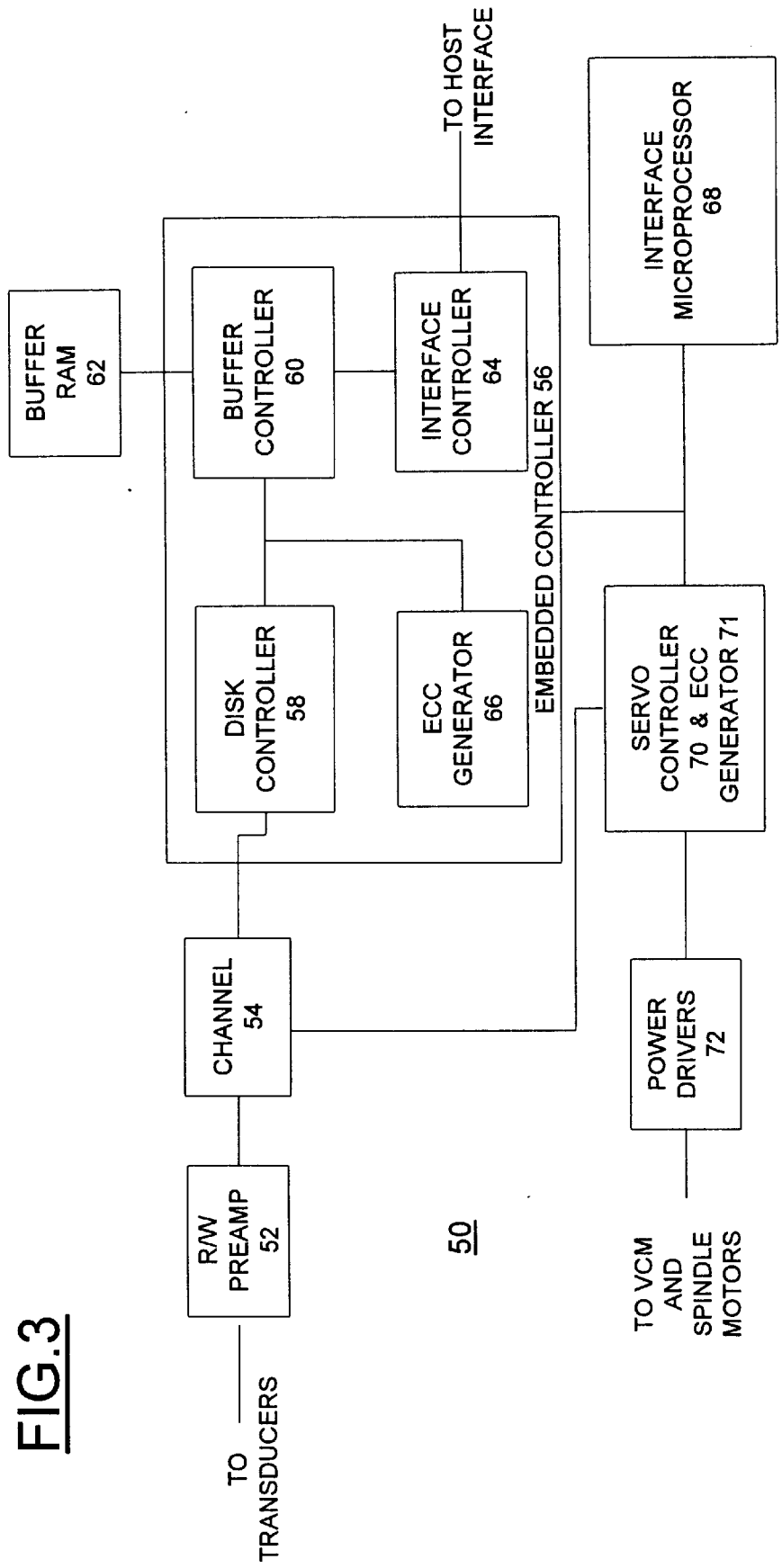
FIG. 3 is a block diagram functional representation illustrating the data storage disk file of FIG. 1.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity is controlled by the current supplied. The various components of the disk file 10 are controlled in operation by signals generated by control unit 14 such as motor control signals on line 26A and position control signals on line 38A.

Referring now to FIG. 3, there is shown a block diagram functional representation of the disk file 10 generally designated as 50 for carrying out the positioning methods of the invention. Servo information and customer data are read by the R/W heads 28 and amplified by a preamplifier (preamp) 52. A data channel 54 uses known sampling techniques for detecting the readback signals from the disk that contain the customer data. An embedded controller 56 includes a disk controller 58 coupled to the data channel 54 and a buffer controller 60 that is coupled to a buffer random access memory (RAM) 62 and is coupled to a host via an interface controller 64. An error correcting code (ECC) generator 66 is coupled between the disk controller 58 and buffer controller 60. An interface microprocessor 68 and a servo controller 70 including an embedded ECC generator 71 are coupled to the embedded controller 56 performing interface processor functions. The servo controller 70 performs servo control functions providing servo positioning control signals to a power drivers block 72 coupled to the VCM 40 and the spindle motor 26. The servo controller 70 with the embedded ECC generator 71 is coupled to the data channel 54 for verifying write positioning in accordance with the invention. The ECC generator 71 optionally can be used for writing servo information with the disk file 10 or alternatively, the servo information in accordance with the invention can be written during the manufacture of the disk file.

ECC generator 66 provides an error detection and correction function to protect the integrity of the customer data from readback errors that are inherent in disk drives. The error detection and correction function is accomplished by appending a predefined number of ECC check bytes of error correcting code (ECC) to the end of the customer data block during a data write operation. The power of the ECC, that is the number of bytes the ECC can protect in a single block and the number of errors the ECC can safely detect and correct, is directly related to the number of ECC check bytes recorded with the customer data block.

U.S. Pat. No. 4,494,234, issued Jan. 15, 1985, U.S. Pat. No. 4,525,838, issued Jun. 25, 1985, U.S. Pat. No. 4,703,485, issued Oct. 27, 1987, and U.S. Pat. No. 4,706,250, issued Nov. 10, 1987, to Arvind M. Patel and assigned to the present assignee, disclose systems and methods for correcting errors, and are hereby incorporated by reference as if fully set forth herein.

Figure 4:
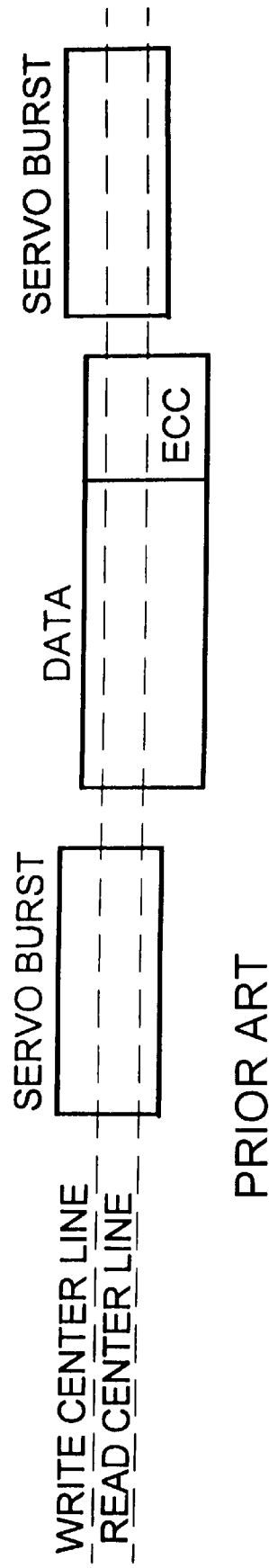
FIG. 4 illustrates a conventional disk format with servo bursts, data and error correcting code (ECC) check bytes.

Having reference to FIG. 4, there is shown a conventional disk format with servo bursts, data and error correcting code (ECC) check bytes for protecting the data. A read centerline and a write centerline are shown in dotted line with respect to a magneto-resistive (MR) transducer head 28 used for reading servo position information and customer data. The MR read transducer head 28 is offset with respect to a thin film inductive transducer head 28 used for writing servo position information and customer data.

Referring also to FIG. 5, there is shown a servo burst 500 arranged in accordance with the invention. The servo burst 500 includes an automatic gain control (AGC) field 502, a servo ID field 504, a main servo address field 506 followed by ECC check bytes 508 and a fine servo field 510. Conventionally, the servo position information provided by the servo address 506 which is Gray coded can be used to resolve the head, sector and track position within +/−1 track and the fine servo 510 can be used to resolve positions of less than 1 track. In accordance with a feature of the invention, the ECC generator 71 is utilized to generate write positioning ECC check bytes 508 for a servo address that are written in a servo burst 500 and used to prevent writing at an incorrect position in the disk file 10. The servo address is determined and available before writing or reading customer data to a particular address on the disk. The embedded ECC generator 71 is used to store servo address ECC check bytes or write positioning check bytes 508 in the servo burst 500 for the purpose of verifying correct positioning on the write operation, to avoid an otherwise possible write positioning error. During a read operation another positioning method must be used since the ECC check bytes 508 are not a Gray code and are valid only while the read transducer head 28 is following track centers, as done when writing.

In accordance with the invention read position verification is separately achieved using the ECC check bytes appended to customer data. The servo address is pre-loaded to the ECC generator 66 before customer data is read. During the write operation as illustrated and described with respect to FIGS. 9A, 9B and 9C, the servo address or logical block address (LBA) is run through the ECC generator 66 but not actually written to the disk. The ECC syndrome check bytes appended to the customer data and written to the disk reflects that the pre-loaded servo address LBA was run through the ECC generator. On a subsequent read operation again preloading of the ECC generator 66 with the servo address or LBA for the particular customer data is provided for the purpose of verifying correct positioning on the read operation, to avoid an otherwise possible read positioning error. The customer data and servo read positioning is protected by the ECC check bytes with an insignificant change in the probability of miss-detection or misscorrection resulting from the additional servo address or LEA pre-loaded to the ECC. By pre-loading the ECC generator 66 with the servo address or LBA, it is possible to detect data errors while preventing reading at an incorrect position.

Referring to FIGS. 6, 7, and 8, there are shown alternative servo burst arrangements respectively designated by 600, 700 and 800 including an additional secondary servo address 612, 712 and 812. The secondary address 612, 712 and 812 in the servo burst includes a portion of the main servo address, such as a portion of the track address and advantageously is Gray coded. The secondary servo address 612 is written adjacent to the servo address 606 of the servo burst 600. The secondary servo address 712 is written in an automatic gain control (AGC) field 702 of the servo burst 700. The secondary servo address 812 is written in the fine servo field 810 of the servo burst 800. The secondary servo address 612, 712 or 812 is read during a seek operation to prevent seeking to an incorrect position. Also multiple copies of the secondary address 612, 712 and 812 can be written in various combinations in the servo burst for redundancy.

Figure 9A:
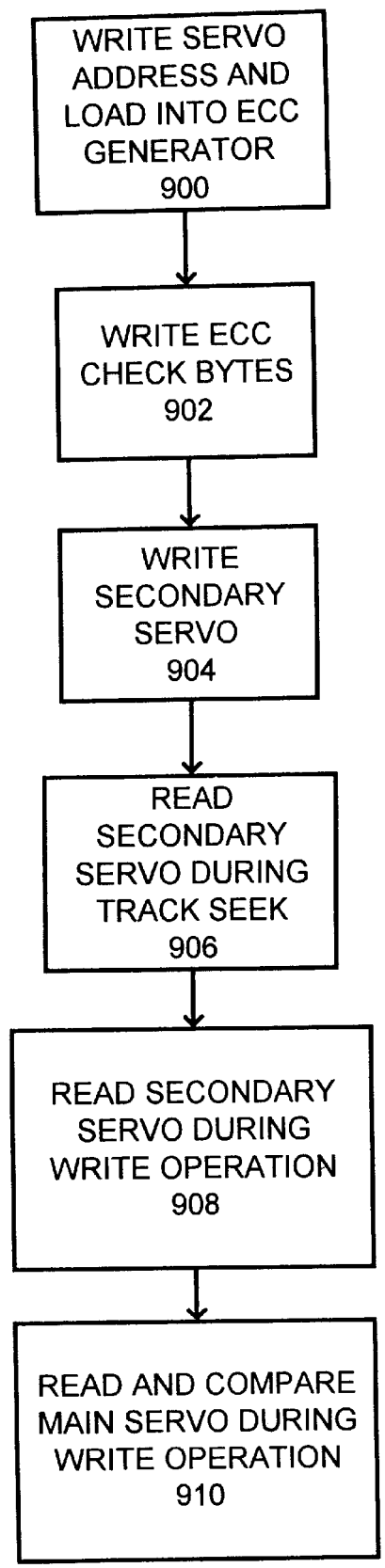
FIGS. 9A, 9B, and 9C together provide a flow chart illustrating sequential steps for writing servo bursts, for track seek operations, writing and reading customer data in accordance with the servo address positioning methods of the invention.
Figure 9B:
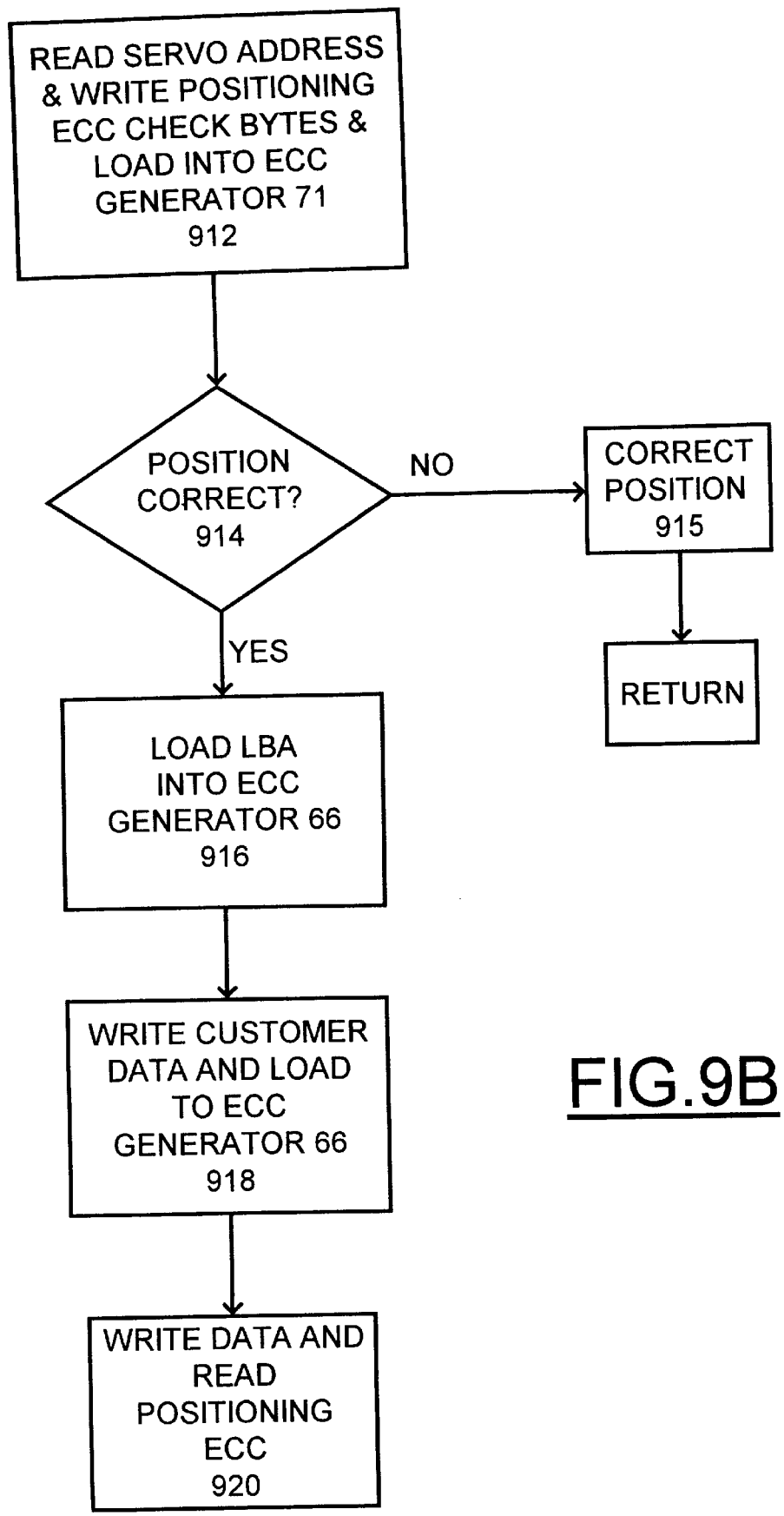
Figure 9C:
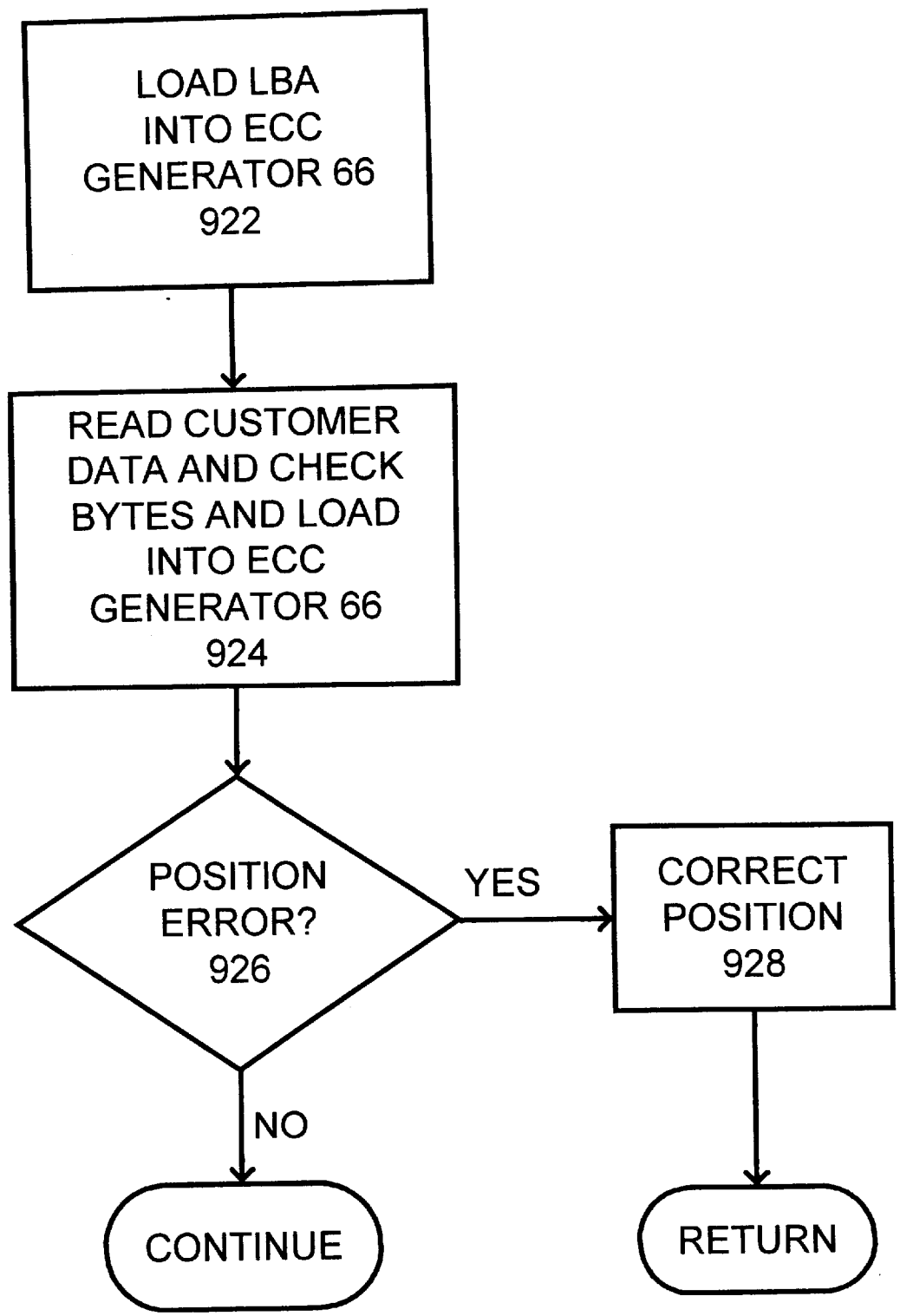

Referring to FIGS. 9A, 9B and 9C, there is shown a flow chart illustrating sequential steps for writing servo bursts, including track seek operations and writing and reading customer data in accordance with the servo address positioning methods of the invention. Initially, a main servo address is written in a servo burst and loaded into the ECC generator.71 for generating write positioning ECC check bytes as indicated at a block 900. The write positioning ECC check bytes are written at the end of the main servo address as indicated it a block 902. A secondary servo address is written to a selected field in the servo burst as indicated at a block 904. The secondary servo address is read during a track seek operation to determine a transducer head position as indicated at a block 906. During a-write operation, the secondary servo address can be read to determine the transducer head position as indicated at a block 908. During the write operation, the main servo address can be read to determine the transducer head position as indicated at a block 910. During a write operation, the secondary servo address can be used exclusively or as a redundancy to the main servo address. The secondary servo address can be used instead of the write positioning check bytes.

Referring to FIG. 9B, when data is to be written, the servo address and the write positioning ECC check bytes in the servo burst are read and loaded into the ECC generator 71 as indicated at a block 912 to determine whether the position is correct as indicated at a decision block 914. When determined that the ECC generator 71 detected an error in the location at block 914, then the position is corrected as indicated at a block 915 and the sequential reading steps are repeated with the correct position for writing the selected customer data. Then the servo address or logical block address (LBA) for the customer data to be written is pre-loaded to the ECC generator 66 as indicated at a decision block 916. Then the customer data are written and the customer data bytes are loaded to the ECC generator 66 as indicated at a block 918. After all the customer data is loaded into ECC generator 66, then the ECC check bytes in ECC generator 66 that are used for normal data error detection and correction and used for read positioning are written to the end of customer data as indicated at a block 920.

Referring to FIG. 9C, when data is to be read, the servo address or logical block address (LBA) for the selected customer data to be read is pre-loaded to the ECC generator 66 as indicated at a decision block 922.

The customer data and read positioning ECC check bytes are read and loaded to the ECC generator 66 as indicated at a block 924. Next it is determined if the ECC generator 66 detected an error in the location where the value LBA N was pre-loaded to the ECC generator as indicated at a decision block 926. When determined that the ECC generator detected an error in the location where the value LBA N was pre-loaded to the ECC generator at block 926, then the position is corrected as indicated at a block 928 and the sequential reading steps are repeated with the correct position for reading the selected customer data. Otherwise, when the position is correct, the sequential steps continue.

While the present invention has been described with reference to the details of the embodiments of the invention shown in the drawing, these details are not intended to limit the scope of the invention as claimed in the appended claims.

What is claimed is:

1. A servo positioning method for writing customer data in a direct access storage device, said method comprising the steps of:

writing a servo address in a servo burst and loading said written servo address into an error correcting code (ECC) generator for generating ECC check bytes;

writing said ECC check bytes at the end of said written servo address;

when customer data is to be written, reading said written servo address and ECC check bytes and loading said read servo address and ECC check bytes to said ECC generator to determine whether said writing position is correct;

responsive to identifying a correct writing position, pre-loading a servo address logical block address (LBA) into a second error correcting code (ECC) generator;

writing customer data and loading said written customer data into said second error correcting code (ECC) generator for generating data and read positioning ECC check bytes; and writing said data and read positioning ECC check bytes at the end of said written customer data.

2. A method as recited in claim 1 further includes the step of when customer data is to be read, preloading said servo address logical block address (LBA) into said second error correcting code (ECC) generator; and reading said written customer data and said data and read positioning ECC check bytes and loading said customer data and said data and read positioning ECC check bytes into said second ECC generator to determine whether the reading position is correct.

3. A method as recited in claim 1 further includes the step of writing a secondary servo address in said servo burst.

4. A method as recited in claim 3 wherein said step of writing said secondary servo address in said servo burst includes writing a portion of said servo address into an automatic gain control (AGC) field in said servo burst.

5. A method as recited in claim 3 wherein said step of writing said secondary servo address in said servo burst includes writing a portion of said servo address adjacent to said written servo address in said servo burst.

6. A method as recited in claim 3 wherein said step of writing said secondary servo address in said servo burst includes writing a portion of said servo address into a fine servo field in said servo burst.

7. A method as recited in claim 3 further includes the step of reading said secondary servo address during a track seek operation.

8. Apparatus for writing customer data in a direct access storage device, comprising:

means for writing a servo address in a servo burst and for loading said written servo address into an error correcting code (ECC) generator for generating ECC check bytes;

means for writing said ECC check bytes at the end of said written servo address;

when customer data is to be written, means for reading said written servo address and ECC check bytes and loading said read servo address and ECC check bytes to said ECC generator to determine whether said writing position is correct;

means, responsive to said reading and loading means identifying a correct writing position, for preloading servo address logical block address (LBA) to a second ECC generator;

means for writing customer data and means for loading said written customer data into said second error correcting code (ECC) generator for generating ECC-check bytes; and means for writing said ECC check bytes from said second error correcting code (ECC) generator at the end of said written customer data.

9. Apparatus as recited in claim 8 further includes means for preloading servo address logical block address, (LBA) to said second ECC generator; means for reading said written customer data and ECC check bytes and loading said read customer data and ECC check bytes into said second ECC generator to determine whether the reading position is correct.

10. Apparatus as recited in claim 8 further includes means for writing a secondary servo address in said servo burst.

11. Apparatus as recited in claim 8 further includes means for writing a secondary servo address in said servo burst, wherein said secondary servo address is a portion of said servo address including a track address.

12. Apparatus as recited in claim 10 further includes means for reading said secondary servo address during a track seek operation.

13. A direct access storage device comprising:

at least one disk mounted in said housing for rotation about an axis and having at least one disk surface for storing data;

transducer means mounted for movement across said disk surface for reading and writing data to said disk surface;

means for identifying a servo address for customer data to be read or written;

an error correcting code (ECC) generator coupled to said servo address identifying means, said ECC generator receiving said identified servo address;

means for writing a servo address in a servo burst and for loading said written servo address into said ECC generator for generating ECC check bytes;

means for writing said ECC check bytes at the end of said written servo address;

when customer data is to be written, means for reading said written servo address and ECC check bytes and loading said read servo address and ECC check bytes to said ECC generator to determine whether said writing position is correct;

means, responsive to said reading and loading means identifying a correct writing position, for preloading servo address logical block address (LBA) to a second ECC generator;

means for writing customer data and means for loading said written customer data into said second error correcting code (ECC) generator for generating ECC check bytes; and means for writing said ECC check bytes from said second error correcting code (ECC) generator at the end of said written customer data.

14. A direct access storage device as recited in claim 13 further includes:

means for reading said customer data and ECC check bytes and for loading said read customer data and ECC check bytes to said second ECC generator; and means for utilizing said read ECC check bytes from said second ECC generator to detect an error in reading position for the customer data.

15. A direct access storage device as recited in claim 13 further includes means for writing a secondary servo address in said servo burst.

16. A direct access storage device as recited in claim 15 further includes means for reading said secondary servo address during a track seek operation.

17. A direct access storage device as recited in claim 15 wherein said secondary servo address includes a portion of said servo address defining a track address.

* * * * *